Jan. 27, 1931.  A. B. WEISSENBORN  1,790,335
POWER LOOM
Filed June 11, 1928  7 Sheets-Sheet 1

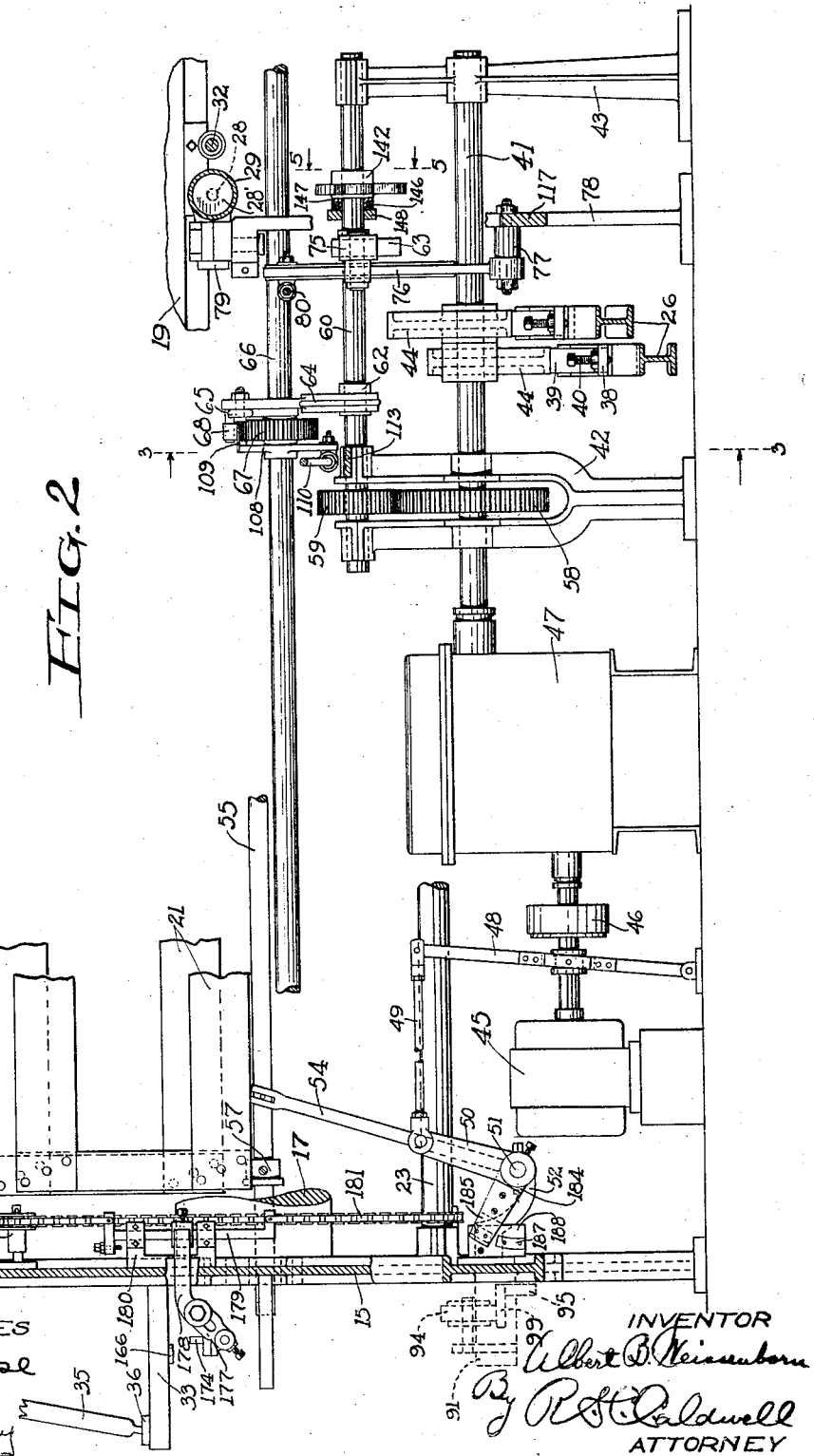

Jan. 27, 1931.  A. B. WEISSENBORN  1,790,335
POWER LOOM
Filed June 11, 1928   7 Sheets-Sheet 3
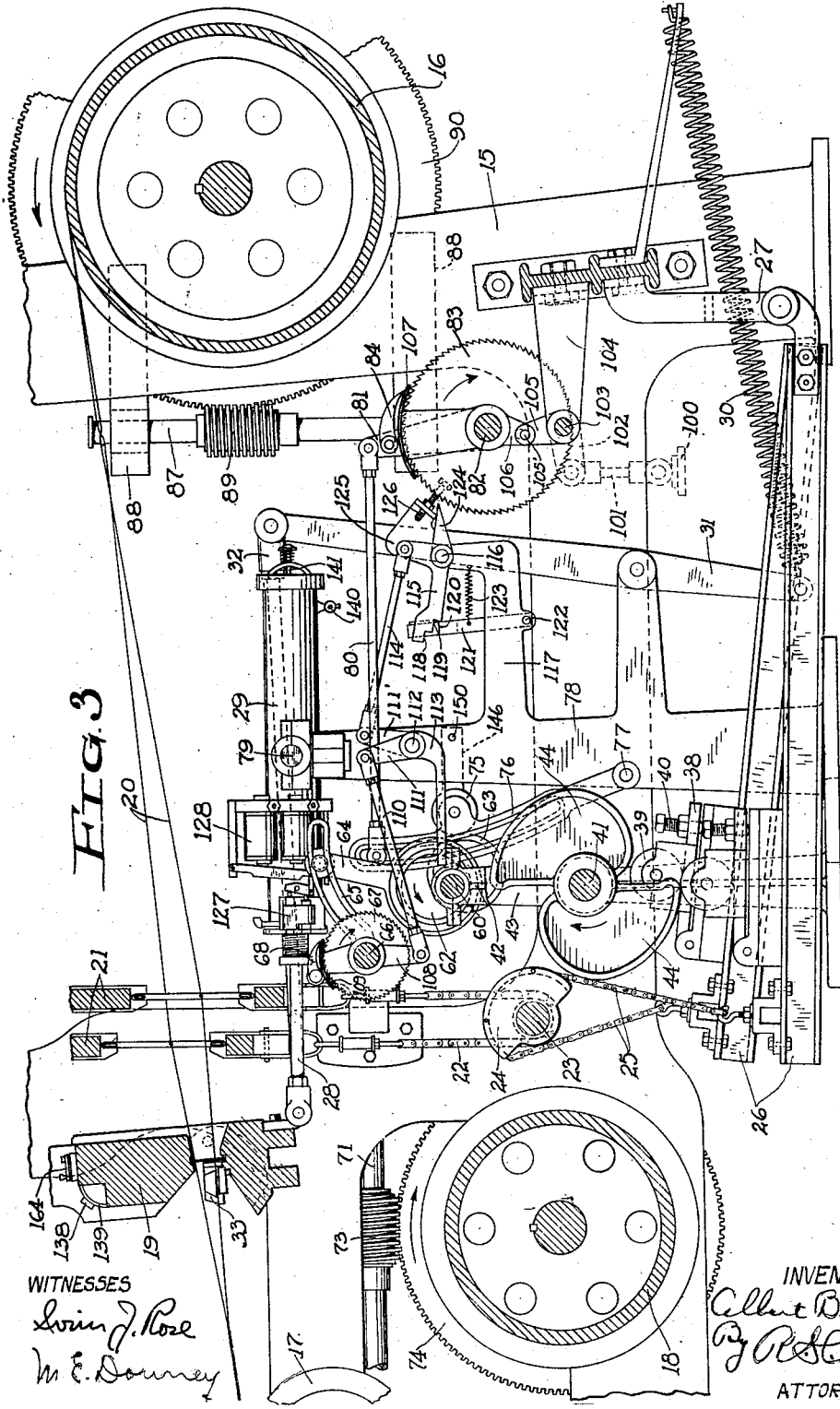
WITNESSES
INVENTOR
Albert B. Weissenborn
By R. S. Caldwell
ATTORNEY

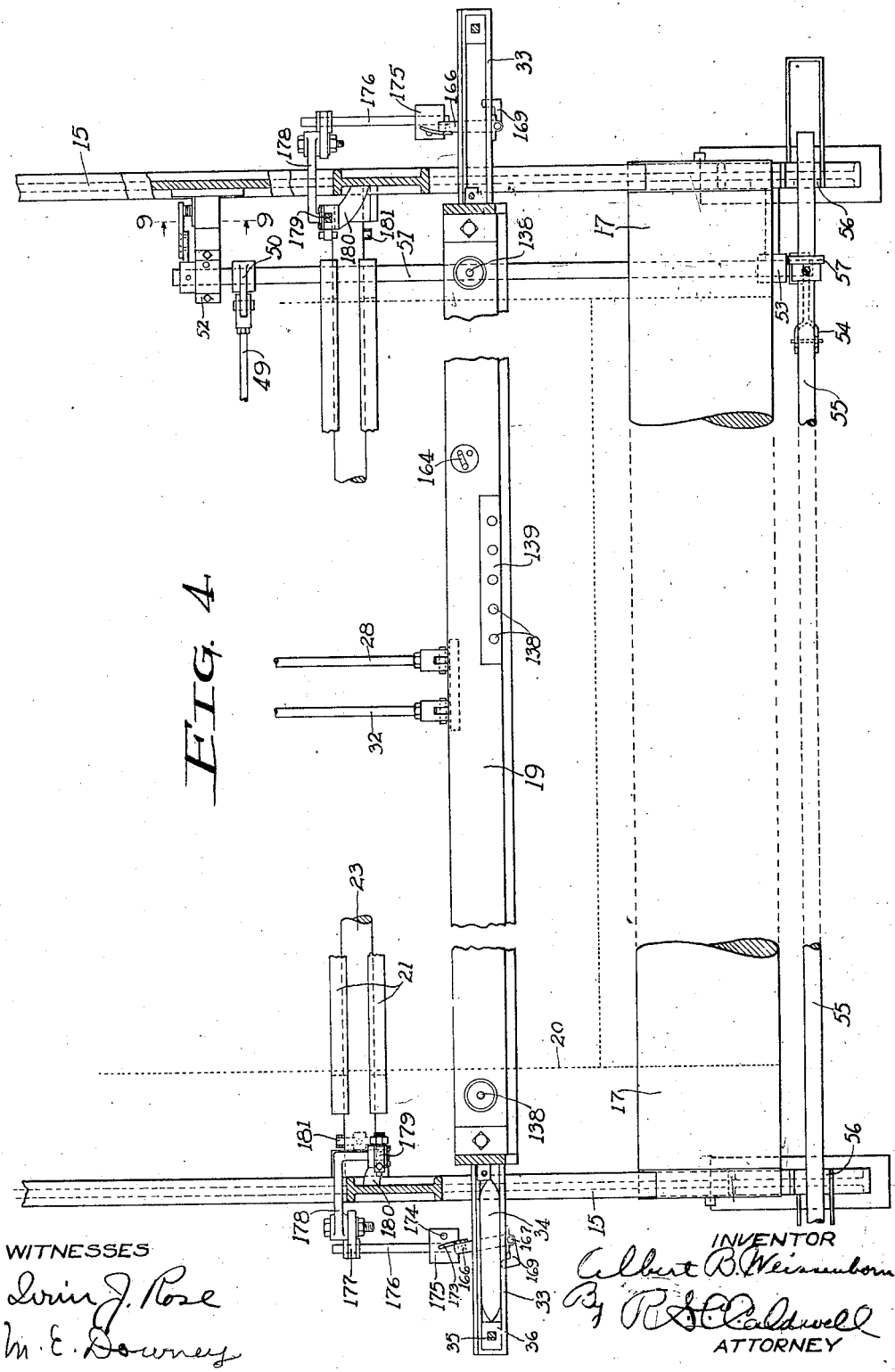

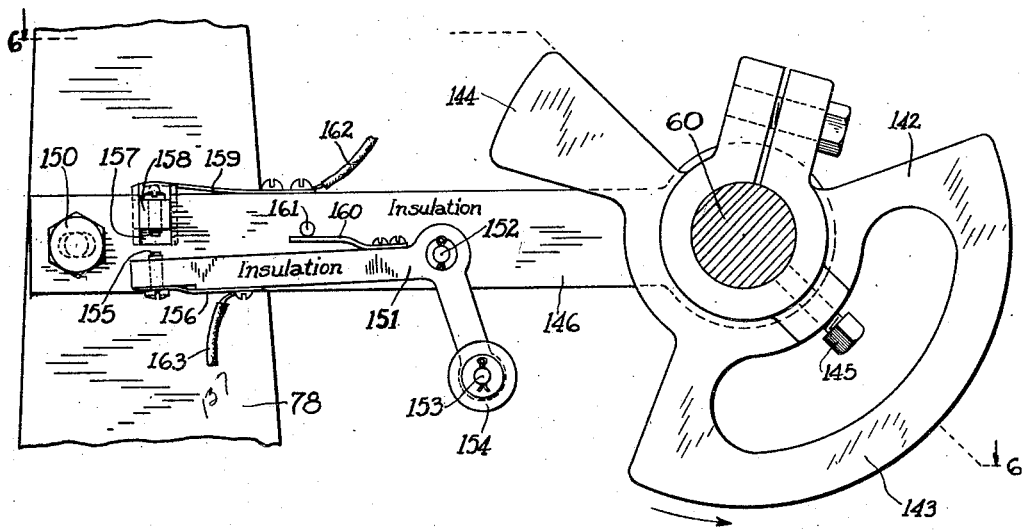
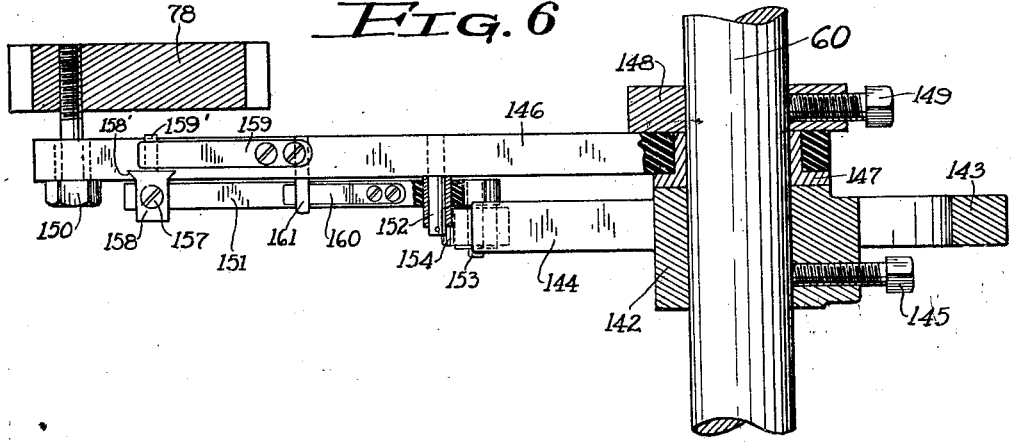

Jan. 27, 1931.  A. B. WEISSENBORN  1,790,335
POWER LOOM
Filed June 11, 1928   7 Sheets-Sheet 6
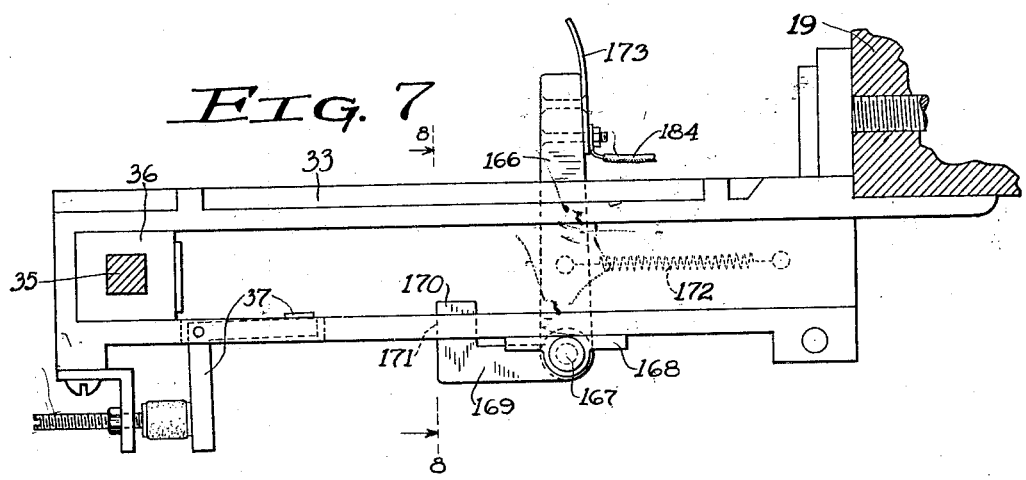
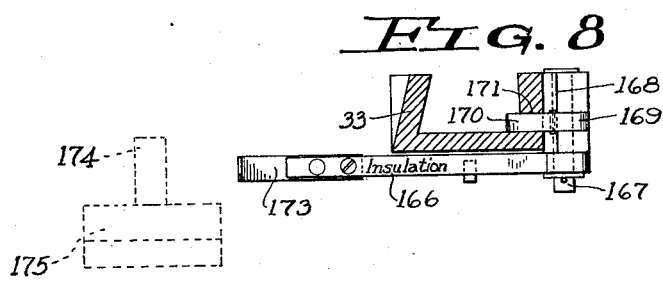
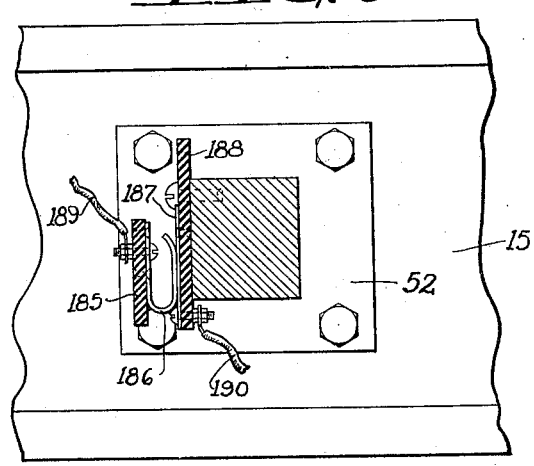
WITNESSES  
INVENTOR  
Albert B. Weissenborn  
ATTORNEY Patented Jan. 27, 1931

1,790,335

UNITED STATES PATENT OFFICE

ALBERT B. WEISSENBORN, OF APPLETON, WISCONSIN, ASSIGNOR TO APPLETON WIRE WORKS, INC., OF APPLETON, WISCONSIN, A CORPORATION OF WISCONSIN

POWER LOOM

Application filed June 11, 1928. Serial No. 284,424.

The invention relates to power looms and more particularly to wire-weaving looms adapted for the production of Fourdrinier wires.

In the usual type of power loom, the power means actuates all the constituent mechanisms and when the power is shifted on, all the loom mechanisms work in co-ordinated relation and cannot be independently operated. This situation introduces difficulties in the tending of the loom, since, for example, if a weft wire is imperfectly laid, back picking is necessary to open the shed at the proper time for the insertion of a substitute weft wire.

In order to avoid the usual difficulties heretofore encountered, it is an object of the present invention to provide a power loom in which the lay motion is controlled either by a power means or independently of the power means, so that in normal operation, the lay motion is co-ordinated with the heddle motion, and when the weft wires require attention these motions can be readily separated from each other to facilitate the changing of the shed and the actuation of the lay.

Another object of the invention is to provide electrically-controlled means for timing the motion of the lay and for permitting the delivery of an accurately-timed second blow or beat of the proper intensity.

A further object is to provide shuttle-operated circuit-closers co-operating with the timing means for preventing the fall of the lay until the shuttle has been properly boxed.

A further object is to provide means for rendering said shuttle-controlled circuit-closers alternately operative to prevent improper operation of the lay.

A further object is to provide means co-operating with power controlling means for retracting the lay when the operation of the loom is stopped.

A further object is to provide an electric loom-controlling system adapted for both automatic and manual control.

The invention further consists in the several features hereinafter set forth and more particularly defined by the annexed claims.

In the accompanying drawings, Fig. 1 is a side elevation of a power loom embodying the invention;

Fig. 2 is a fragmentary sectional elevation of the loom taken along the line 2—2 of Fig. 1;

Fig. 3 is a fragmentary sectional elevation of the loom taken along the line 3—3 of Fig. 2;

Fig. 4 is a fragmentary sectional plan view taken along the line 4—4 of Fig. 1;

Fig. 5 is a detail sectional view of an electrical timing apparatus taken along the line 5—5 of Fig. 2;

Fig. 6 is a plan view of the timing mechanism of Fig. 5, parts being broken away and parts being shown in section;

Fig. 7 is a detail plan view of a shuttle box including a shuttle-operated circuit-closer;

Fig. 8 is a detail transverse sectional view of the shuttle box taken along the line 8—8 of Fig. 7;

Fig. 9 is a detail sectional view of a lay-controlling circuit-closer taken along the line 9—9 of Fig. 4.

Figure 1:
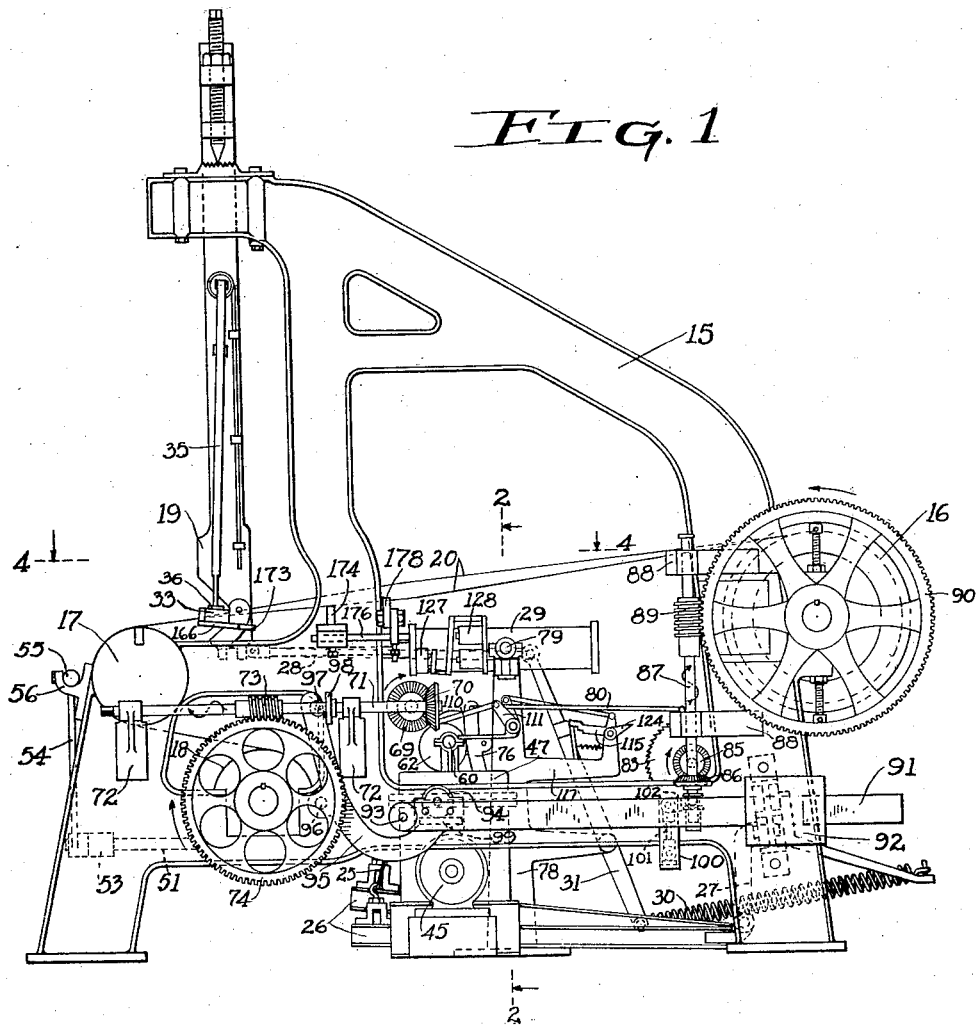

In these drawings, the numeral 15 designates the spaced side frame members of a loom between which are mounted the warp-beam 16, the breast beam 17 and the receiving-roll 18, all as usual. A swinging lay 19 is operated, as hereinafter described, to beat up the weft wire left by the shuttle in its travel through the shed formed between the warp wires 20 by the alternate reciprocation of the heddles 21. The heddles are connected by a chain 22 to an oscillatory heddle shaft 23 in the usual manner, and the heddle shaft is provided with a collar 24 which is connected by chains 25 to a pair of treadles 26 which are pivotally mounted at their rear portions on a bracket 27 secured to the loom frame. The treadles 26 serve to oscillate the heddle shaft 23 through the chains 25 and in the present instance the treadles are automatically operated in a manner hereinafter described.

As is usual, the lay 19 is retracted to its dwell by a pivotally-connected piston rod 28 secured to a piston 28′ working an air cylinder 29, and is returned by a coiled tension spring 30 connected at one end to the frame of the loom and at its other end to a lever 31 operatively connected to the lay by a link 32, the spring being capable of adjustment to regulate the throw of the lay. The admission of air to the cylinder 29 is both automatically and manually controlled in a manner hereinafter described.

The swinging lay 19 is provided with the usual shuttle boxes 33 at opposite ends alternately receiving the shuttle 34 which passes over the usual shuttle track. The shuttle is thrown through the shed in the usual manner by means of picker sticks 35 each carrying a picker block 36 engageable with the shuttle. The usual shuttle braking means 37 may be provided on each shuttle box.

The treadles 26 each carry a roller support 38 provided with a roller 39, and preferably each roller support is adjustable in height by means of a screw 40. A horizontally-disposed cam shaft 41 extends transversely above the treadles 26 and is journalled in standards 42 and 43. Cams 44 are secured to the cam shaft 41 and bear on the rollers 39 to effect the alternate movement of the treadles 26, which latter in turn effect the reciprocation of the heddles 21 in a manner heretofore described. The cam shaft 41 is driven from any suitable source of power, preferably an electric motor 45 which communicates power to the cam shaft through a friction clutch 46 and a speed reducer 47. The clutch is provided with a shifting lever 48 connected by a link 49 to a lever 50 secured to a horizontally-disposed rock shaft 51. The rock shaft 51 is journalled in bearing brackets 52 and 53 carried by one of the side frame members 15 of the loom and the forward end of the rock shaft is disposed near the lower portions of the frame member below the breast beam 17. A lever 54 is secured to the forward end of the rock shaft and extends upwardly therefrom into operative connection with a horizontally-disposed longitudinally shiftable rod 55 spaced forwardly from the breast beam 17. The rod 55 extends longitudinally of the breast beam 17 and has its end portions slidably mounted in brackets 56 carried on the side frame members 15, a stop collar 57 being secured to the rod to limit the movement of the rod in clutch-releasing direction. By means of the above described connections including the rod 55, the weaver is able to communicate power to the cam shaft 41 or to stop the operation of the cam shaft, and this may be accomplished at any point along the front of the machine, which may be of considerable width, frequently in excess of 25 feet.

The cam shaft 41 has secured thereto a gear 58 which meshes with a gear 59 secured to a shaft 60 disposed above and in parallel relation to the cam shaft 41 and journalled in the brackets 42 and 43. The gearing connection between these shafts is such that the shaft 60 rotates twice as fast as the cam shaft 41, and the shaft 60 serves a lay-timing function as hereinafter described.

Eccentrics 62 and 63 are secured to the shaft 60 and respectively effect the take-up and let-off operations. An eccentric strap 64 surrounds the eccentric 62 and is provided with an upwardly projecting arm which is adjustably secured to a longitudinally slotted arcuate arm of a bell crank 65 loosely mounted on a suitably supported take-up shaft 66. A ratchet wheel 67 is secured to the take-up shaft 66 and is acted upon by a pawl 68 carried by the other arm of the bell crank 65. The take-up shaft 66 extends between the end members 15 of the loom frame and is provided with bevel gears 69 at its ends meshing with bevel gears 70 secured to horizontally-disposed shafts 71 journalled in suitable bearings 72. Each shaft 71 carries a worm 73 meshing with a worm wheel 74 on the receiving roll 18, so that the rotation of the worm wheel 74 by the worm 73 serves to take up the cloth as it is woven. The operative relation of the take-up shaft to the receiving roll is generally similar to that described in United States Letters Patent No. 1,479,571 issued to me January 1, 1924.

The eccentric 63 on the shaft 60 bears on a roller 75 carried on a longitudinally slotted lever 76 pivotally mounted on its lower end on a pivot member 77 secured to a standard member 78, this standard member also receiving a trunnion 79 at its upper end on which the air cylinder 29 is pivotally supported. The slotted portion of the lever 76 adjustably receives therein one end of a connecting rod 80, the other end of which is connected to a rocker arm 81 loosely mounted on a suitably supported let-off shaft 82. A ratchet wheel 83 is secured to the let-off shaft 82 and is acted upon by a pawl 84 carried by the rocker arm 81. The let-off shaft 82 extends between the end members 15 of the loom frame and is provided with bevel gears 85 at opposite ends each meshing with a bevel gear 86 on a vertically-disposed shaft 87 journalled in bearing brackets 88. The shaft 87 carries a worm 89 which meshes with a worm wheel 90 on the warp beam 16, the rotation of the worm wheel 90 by the worm 89 permitting the warp wires to be withdrawn as required from the warp beam. The operative relation of the let-off shaft to the warp beam is generally similar to that described in the above noted United States Letters Patent No. 1,479,571.

The rocking travel of the bell crank 65 on the take-up shaft 66 is constant but adjustable in extent by changing the position of the eccentric strap 64 along the slotted arm of the bell crank, and the travel of the rocker arm 81 on the let-off shaft 82 is also constant but is adjustable in extent by varying the position of the connecting rod 80 along the slotted portion of the lever 76. The take-up and let-off are preferably arranged so that they occur substantially simultaneously and this is accomplished by suitably adjusting the relative positions of the eccentrics 62 and 63 on the shaft 60.

The tensioning of the warp wires may be accomplished in any suitable manner and in the present instance is effected by means including a pair of weighted horizontally disposed tensioned levers 91 arranged at opposite sides of the loom frame and each having a weight 92 adjustably mounted thereon. Each tension lever 91 is pivotally mounted near the lower portion of an end member of the loom frame on a pivot member 93 and has a roller 94 secured thereto near its pivotal mounting. A lever 95 is pivotally mounted intermediate its ends on a pivot member 96 forward of the pivot member 93 and carries a roller 97 at its upper end engageable with a collar 98 secured to the worm shaft 71. The other end of each lever 95 is provided with a trackway 99 on which the roller 94 presses by reason of the weight of the tension lever 91, and this force is communicated through the lever 95 to the collar 98 on the worm shaft 71, thus tending to rotate the receiving roll 18 in a take-up direction and placing tension on the wire cloth and connected warp wires.

One of the tension levers 91 carries a depending bracket 100 which is connected by a link 101 to a lever 102 secured to a horizontally disposed governor shaft 103. The governor shaft 103 is arranged below the let-off shaft 82 in parallel relation thereto and is journalled in suitable bearing brackets 104. One end of the governor shaft extends adjacent the ratchet wheel 83 on the let-off shaft 82 and is provided with an arm 105 having a pin-and-slot connection 105' with another arm 106 which is loosely mounted intermediate its ends on the let-off shaft 82. The upper end of the arm 106 carries an arcuate sheet metal shield 107 disposed closely adjacent the toothed periphery of the ratchet wheel 83, and the pawl 84 on the rocker arm 81 rides on the outer surface of the shield 107 to prevent the engagement of the pawl with the ratchet wheel during a portion of the travel of the pawl. The length of the effective stroke of the pawl in engagement with the ratchet wheel 83 is thereby determined by the position of the shield which in turn is determined by the position of the tension lever 91 through the linkage above described. As the take-up increases the tension lever 91 rises through the action of the lever 95 and the position of the shield then changes to permit an increased let-off. This method of governing the let-off is generally similar to that described in the above-noted United States Letters Patent No. 1,479,571.

A rocker arm 108 is loosely mounted on the take-up shaft 66 laterally adjacent the ratchet wheel 67 and the upper end of this rocker arm is provided with an arcuate sheet metal shield 109 interposed between the toothed periphery of the ratchet wheel and the pawl 68, which rides on the outer surface of the shield during part of its reciprocatory travel. The lower end of the rocker arm 108 is connected by a rod 110 to the upper end of a rocker arm 111 secured to a shaft 112 journalled in a bracket 113 mounted on the standard 42. Another rocker arm 111' is secured to the shaft 112 and has its upper end pivotally connected by a rod 114 to one arm of a bell crank 115. The bell crank 115 is secured to a shaft 116 journalled in a bracket 117 mounted on the standard 78. The outer end of the other arm of the bell crank 115 is provided with stepped notches 118 and 119, which are alternatively engageable with a shoulder 120 on a lever 121 pivotally mounted at its lower end on a pivot member 122 secured to the bracket 117. A coiled spring 123 urges the lever 121 in a direction toward the shaft 116. An arm 124 is secured to the shaft 116 to rock with the bell crank 115 and is engageable by a bracket 125 secured to the lay-operating lever 31. This engagement of the bracket 125 with the arm 124 occurs during the rearward movement of the lever 31 and serves to lift the bell crank 115 sufficiently to permit the stop 120 of the lever 121 to enter the lower notch 119 at the end of the bell crank 115 under urge of the spring 123. An adjustably mounted tappet screw 126 is carried by the bracket 125 and is engageable with the lever 121 in the forward position of the lay-operating lever 31. The forward travel of the lever 31 is determined by the position of the newly woven cloth and at some period the travel of the lever is sufficient to cause the tappet screw 126 to engage the lever 121 and displace the latter lever sufficiently so that the bell crank 115 will rock to a position limited by the engagement of the upper notch 118 with the shoulder 120 on the lever 121. In this position of the bell crank 115, the shield 109 for the take-up ratchet wheel 67 is advanced in the direction of the operative travel of the pawl 68, so that the effective travel of the pawl is shortened, thereby reducing the degree of take-up. This permits the edge of the newly-woven cloth to advance in the direction of the lay, which in turn gradually reduces the forward travel of the lever 31, and after a short interval the forward travel of the lever 31 is reduced to a point where the tappet screw 126 will not displace the lever 121 sufficiently to move it out of the lower notch 119 of the bell crank 115, it being noted that the lever 121 returns to the lower notch 119 during every rearward stroke of the lever 31. This position of the bell crank 115 determines a new position for the shield 109 for the take-up ratchet wheel by reason of which the pawl 68 is given a longer effective stroke, so that the degree of take-up is increased and the edge of the newly-woven cloth again approaches its normal position.

As heretofore stated, the lay 19 is retracted to its dwell by means including an air cylinder 29, a piston 28' in which is connected to the lay by the piston rod 28. A valve 127, which is mounted on the cylinder 29, in one position admits compressed air to the cylinder 29 and in another position permits the exhaust from the cylinder. The valve is operated to the former position by an electromagnet 128 and returns to the exhaust position when the electro-magnet is de-energized. This valve and its operating means is of any suitable construction, such as described in United States Letters Patent No. 811,012, granted to me January 30, 1906.

Figure 10:
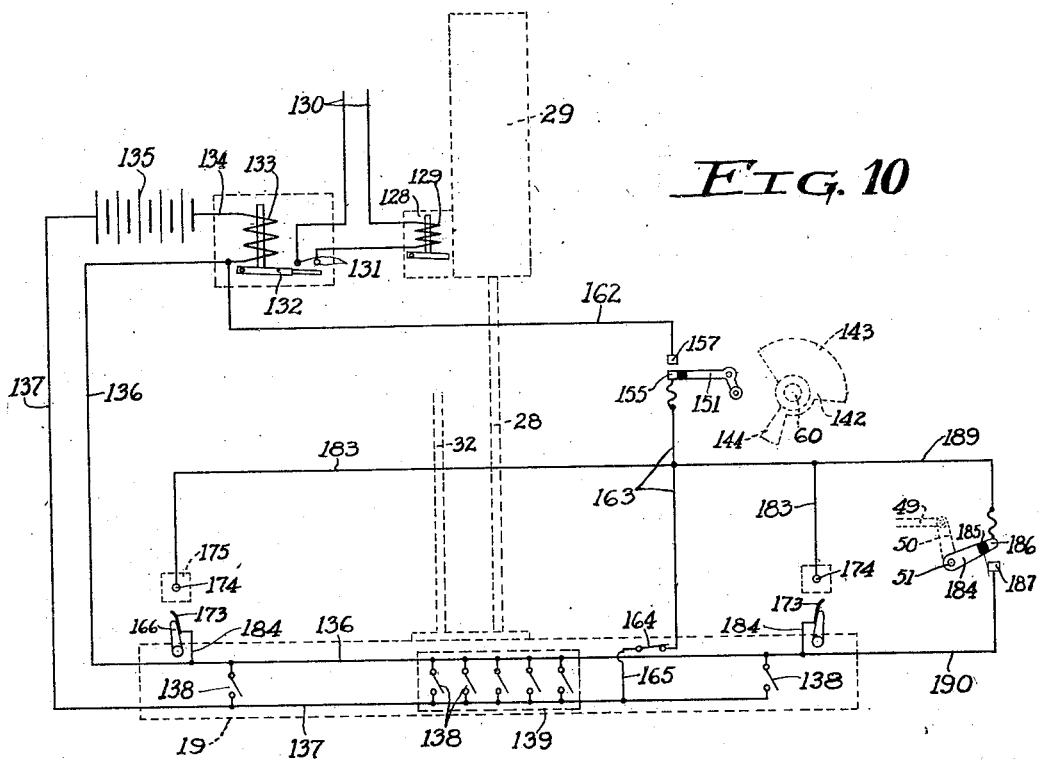
Fig. 10 is a schematic wiring diagram of the loom-controlling system.

The winding 129 of the electro-magnet 128 is connected to supply mains 130, as seen in Fig. 10, the supply circuit including relay contacts 131 forming part of an electro-magnetically-operated relay circuit closer 132 including a winding 133. One end of the relay winding 133 is connected by a conductor 134 to a low voltage battery 135 and the other end of the winding is connected by a conductor 136 which includes a portion extending along the lay. Another conductor 137 is connected to the other side of the battery 135 and also includes a portion extending along the lay, and those portions of the conductors 136 and 137 along the lay are connected by a plurality of push-button circuit closers 138, a number of which are mounted in a button-plate 139, as in the above noted United States Letters Patent No. 811,012, while others are placed near the ends of the lay. The closing of any one of the push-button circuit closers 138 by the weaver establishes a relay circuit including the conductors 134, 136 and 137, the battery 135 and the relay winding 133, thus closing the relay contacts and causing a current to flow from the supply mains 130 to the winding 129 of the valve-operating electro-magnet 128. The energization of the electro-magnet 128 operates the valve 127 to admit compressed air behind the piston in the cylinder 29, thereby retracting the lay to its dwell. To avoid jarring of the mechanism, the exhaust of air from the outer side of the piston is preferably delayed by means of a pet-cock 140.

When the weaver releases the push-button 138 on the lay, the relay circuit is opened which in turn opens the supply circuit including the winding 129 of the valve-operating electro-magnet 128, thus de-energizing this electro-magnet and permitting the valve 127 to move to its exhaust position. The lay then falls to beat up the weft wire under urge of the spring 30 acting on the lever 31, and in order to permit the relatively free fall of the lay, the outer end of the cylinder 29 is provided with an inwardly opening spring-urged valve 141, which admits air freely into the outer end of the cylinder. By the means above described, the weaver is thus able to manually control the operation of the lay.

In addition to this manual control, however, the operation of the lay is normally under automatic control, as hereinafter described. The shaft 60 is provided with a timer cam 142 having a lobe 143 and a lobe 144 at substantially opposite portions, a set screw 145 being provided to adjustably secure the cam on the shaft. A horizontally-extending bar 146, preferably of insulating material, has a bushed end 147 which is loosely mounted on the shaft 60 laterally adjacent the cam 142 and is retained in such position by means of a collar 148 provided with a set screw 149. The other end of the bar 146 is secured to the standard 78 by a bolt 150 in a manner permitting a slight relative movement between these members. A bell crank 151 is pivotally mounted on a pin 152 secured to the bar 146 and includes a depending arm carrying a pin 153 on which a roller 154 is journalled to lie in the path of the two-lobed cam 142. The other arm of the bell crank 151 is provided with a contact screw 155 bearing against a terminal strip 156 and is intermittently engageable with a superposed contact screw 157 carried by a holder 158 slidably mounted for vertical movement in a dove-tail groove 158' formed in the bar 146. A contact spring 159 secured to the upper edge of the bar 146 retains the contact holder 158 in its normal lowermost position by engagement with a laterally extending pin 159' on the holder but permits the holder to yield upwardly under urge of the contact screw 155. A flat spring 160 secured to the bell crank 151 is engageable with a pin 161 mounted on the bar 146 to insure the separation of the contact screws 155 and 157. The rotation of the shaft 60 causes the successive engagement of the long and short cam lobes 143 and 144 with the roller 154 on the bell crank 151, thus intermittently rocking the bell crank to effect the engagement of the contact members 155 and 157 for successive long and short periods of time.

The contact spring 159 for the contact screw 157 is connected by a conductor 162 which leads to that end of the relay winding 133 to which the conductor 136 is connected, and the contact strip 156 for the contact screw 155 is connected by a conductor 163 to one terminal of a normally closed circuit-closer 164 mounted on the lay, the other terminal of the circuit-closer 164 being connected by a conductor 165 to the lay conductor 137, which latter leads directly from the low-voltage battery 135. The circuit-closer 164 is mounted on the lay near the buttonplate 139 for convenient operation by the weaver and remains in either its "on" or its "off" position.

The timer contacts 155 and 157 contact twice for each revolution of the shaft 60, and remain in contact for a relatively long period when the cam lobe 143 engages the bell crank roller 154, and for a relatively short period when the short cam lobe 144 engages the roller. When the timer contacts are in engagement a relay circuit is established which includes the battery 135, the conductors 137 and 165, lay circuit-closer 164, conductor 163, engaging contacts 155 and 157, conductor 162, relay winding 133 and conductor 134 back to the battery, thus permitting a current to flow energizing the relay winding 133 and causing the operation of the valve 127 on the cylinder 29 in a manner heretofore described to admit compressed air to the cylinder and cause the retraction of the lay. When the cam lobe 143 rocks the bell crank 151 to engage the timer contacts 155 and 157, the lay is retracted to its dwell preceding its principal blow or beat, and when the shorter cam lobe 144 closes the contacts 155 and 157 in a similar manner, the lay is retracted in preparation for a short second blow or beat. As soon as the short cam lobe leaves the rocker arm 151, the contacts 155 and 157 separate to permit the delivery of the second blow or beat which is thereby accurately timed in the cycle of operation. The intensity of the short blow is determined by the length of the cam lobe 144 which in turn limits the extent of the retraction of the lay, since the relay circuit will not remain closed a sufficient length of time to permit the full retraction of the lay. The second blow or beat of the lay serves to expedite the crimping of the wire and facilitates the production of fine mesh fabric. When the longer cam lobe 143 leaves the bell crank 151 of the timing device, the contacts 155 and 157 are again separated and this occurrence could be employed to open the relay circuit and thereby initiate the principal blow or beat of the lay in the same manner as the short blow or beat takes place.

In the present instance, however, the fall of the lay is not determined by this occurrence but is made dependent upon the arrival of the shuttle in either of the shuttle boxes, by means hereinafter described, in order to avoid damage to the loom in case the shuttle fails to be properly boxed. This interlocking feature is accomplished in general by continuing the relay circuit after the contacts 155 and 157 separate and subsequently breaking the relay circuit by means of shuttle-operated circuit-closers located at the shuttle boxes.

Each shuttle box circuit-closer includes an arm 166 of insulating material arranged transversely below the shuttle box and journalled on an upright shaft 167 secured to a bracket 168 at the front face of the shuttle box. A hook-shaped arm 169 is fixedly secured to the arm 166 and includes a laterally-extending end 170 projecting through an opening 171 in the forward wall of the shuttle box in position to be displaced by the shuttle entering the shuttle box. The connected arms 166 and 169 are normally urged by a tension spring 172 to a position permitting their displacement by the arriving shuttle. The outer end of the arm 166 carries a contact shoe 173 which is intermittently engageable with an upright contact pin 174 movable in a vertical path to alternative vertically-spaced positions determined by the shed-forming position of the heddles. Each contact pin is mounted in an insulating block 175 carried by a rod 176 secured to an arm 177 adjustably mounted on a bracket 178 fixed to a vertically reciprocable bar 179. Each bar 179 is slidably guided in a bracket 180 and is reciprocated by means of a chain 181 secured to the heddle shaft 23, the upper bight of the chain being carried on a supporting pulley 182. The reciprocable bar 179 is secured to one flight of the chain 181 at one side of the loom and to the opposite side of the corresponding chain at the other side of the loom, so that the contact pins 174 at opposite sides of the loom will be at the opposite ends of their vertical travel, the contact pin 174 which is at its upper position being adjacent the shuttle box about to receive the shuttle. In practice the chain 181 and bar 179 may be parts of existing mechanism employed for the picker motion, as exemplified in the United States Letters Patent No. 978,248, granted to me December 13, 1910. The contact pins 174 are connected by conductors 183 joining the conductor 163, and the contact shoes 173 are connected by conductors 184 joining the lay conductor 136, so that the circuit-closers formed at the shuttle boxes are arranged in parallel with the timer circuit-closer 155—157.

As heretofore noted, the lay is retracted to its dwell when the long lobe 143 of the timer cam 142 displaces the bell crank 151 to close the relay circuit at the contacts 155 and 157. When the lay retracts its dwell, the contact shoe 173 adjacent the shuttle box about to receive the shuttle engages the adjacent contact pin 174 which is then in its upper position, the other contact pin 174 at the other side of the loom being in its lower position out of the path of movement of the corresponding contact shoe. The engagement of the contact shoe 173 with the contact pin 174 establishes a circuit from the battery 135, conductors 137 and 165, circuit-closer 164, conductors 163 and 183, contact members 173 and 174 of one shuttle box circuit-closer, conductors 184 and 136, relay winding 133, and conductor 134 back to the battery. In this manner, the relay circuit is provided with a portion in parallel with the timer contacts 155 and 157 so that when the timer cam lobe 143 runs off the bell crank 151 to permit the separation of the latter contacts, the relay circuit will not be broken at such time. Shortly thereafter, however, the shuttle arrives at the shuttle box after laying a weft wire and displaces the lever 169 to open the relay circuit at the contact members 173 and 174, thereby permitting the fall of the lay on its principal blow to beat up the weft wire. Following the principal beat of the lay, the short lobe of the timer cam 142 again rocks the timer bell crank 151 to close the relay circuit at the contact members 155 and 157, thus causing the lay to deliver the short second blow in a manner heretofore described. Following the second blow, the long lobe 143 of the timer cam 142 once more engages the timer bell crank 151 to re-establish the relay circuit and thus causes the retraction of the lay to its dwell, and the cycle of operation is repeated employing the shuttle box circuit-closer at the other side of the loom.

In order to insure the retraction of the lay to its dwell when the driving motor 45 is released from its driving connection with the cam shaft 41 and timer shaft 60, the clutch-operating rock shaft 51 actuates a circuit-closer which will close the relay circuit to thereby control the operation of the air valve on the lay cylinder. For this purpose, the rock shaft 51 has secured thereon an arm 184 carrying an insulating plate 185. A contact shoe 186 is secured to the insulating plate 185 and is engageable with a stationary contact shoe 187 carried on an insulating plate 188 secured to the bearing bracket 52 for the shaft 51. The movable contact shoe 186 is connected by a conductor 189 with the conductor 183 and the stationary contact shoe 187 is connected by a conductor 190 joining the conductor 136. In this manner the circuit-closer formed by the contact members 186 and 187 is arranged in parallel with the shuttle box circuit-closers, so that the release of the clutch will simultaneously effect the engagement of the contact members 186 and 187 to close the relay circuit, and thereby immediately effect the retraction of the lay. When the clutch is again engaged, the contact members 186 and 187 are separated to permit the resumption of normal loom operation.

In the normal operation of the loom, the lay circuit-closer 164 is kept closed and the co-ordinated motion of the lay with respect to the heddle motion and the shuttle motion is controlled automatically in the manner heretofore set forth. When the weaver perceives that the supply of weft wire remaining on the shuttle bobbin after a shot is insufficient for the next shot, he shifts the clutch-operating rod 55 after the weft wire has been properly beaten up but before the shuttle is ready to leave the shuttle box. The shifting of the clutch-operating rod 55 immediately stops the rotation of the heddle-operating cam shaft 41 and the timer shaft 60, as well as immediately effecting the retraction of the lay to its dwell as heretofore described, and the weaver thereupon replaces the bobbin in the shuttle and again sets the loom in normal operation by operating the clutch-operating rod 55. In the event that a short weft wire has been laid but not yet beaten up, the weaver upon noticing the condition can immediately prevent the fall of the lay and shut off the power by operating the clutch-operating rod, and if the first blow has been inadvertently delivered, the second blow can be prevented in a like manner. It will also be noted that the fall of the lay can be prevented by pressing any one of the push-button circuit-closers 138 on the lay, without shifting the clutch-operating rod, but in such event the rotation of the heddle-operating cam shaft continues. In case a weft wire is imperfectly laid, a substitute weft wire can be readily provided, since the shed can be changed independently of the lay motion by merely continuing the power operation of the heddles while preventing the operation of the lay. When the lay circuit-closer 164 is open, the relay circuit cannot be closed by any of the several other circuit-closers, and the lay is then in its substantially vertical inactive position free of the cloth in readiness for retraction. The spring 30 acts on the lay during the initial part of its movement and not beyond the inactive position of the lay.

It will be seen that the present invention provides a power loom in which the lay motion and heddle motion are co-ordinated to provide uniform and accurate weaving, but that these two motions are nevertheless capable of separate independent control to facilitate the tending of the loom.

What I claim as new and desire to secure by Letters Patent is:

1. In a power loom, the combination of a heddle motion, means for cyclically operating said heddle motion, a lay motion, electrically-controlled means for operating said lay motion, timing means controlled by said first means for co-ordinating the operation of said lay motion with said heddle motion, and means for operating said lay motion independently of said timing means.

2. In a power loom, the combination of a lay motion, a circuit-closer, means mechanically independent of said lay motion for operating said circuit-closer and including a rotary element, and electrically-controlled means co-operating with said circuit-closer for operating said lay motion.

3. In a power loom having a lay motion, the combination of a lay-controlling circuit-closer, means for cyclically operating said circuit-closer for spaced periods of different duration, and electrically-controlled means co-operating with said circuit-closer for operating said lay motion to produce successive lay beats of different character.

4. In a power loom, the combination of a circuit-closer, means for cyclically operating said circuit-closer including a rotary cam provided with two spaced cam projections having an operative connection with said circuit-closer for rendering said circuit-closer active for successive spaced periods of different duration, a lay, and electrically-controlled means co-operating with said intermittently operated circuit-closer for causing said lay to execute spaced beats of different character.

5. In a power loom, the combination of a lay, a circuit-closer, means for cyclically operating said circuit-closer including a rotary cam provided with two spaced cam projections having an operative connection with said circuit-closer for rendering said circuit-closer active for successive spaced periods of different duration, means for controlling the operation of said lay including an electric circuit embodying said circuit-closer, and shuttle-controlled circuit-closer means in said circuit for controlling one of the different strokes of said lay.

6. In a power loom, the combination of a lay, means for cyclically operating said lay including an electric controlling circuit, a circuit-closer in said circuit, power means mechanically independent of said lay for cyclically operating said circuit-closer to effect the retraction of the lay, and a shuttle-controlled circuit-closer in said circuit preventing the operative stroke of said lay until the shuttle has completed its travel.

7. In a power loom, the combination of a lay motion including a lay, cyclically-actuated means for controlling the operation of said lay motion, manually-operated means for controlling the operation of said cyclically-actuated means, and means operated simultaneously with the stopping of said cyclically-actuated means for effecting the retraction of said lay.

8. In a power loom, the combination of a lay motion including a lay, means for cyclically operating said lay motion including an electric controlling circuit, a circuit-closer in said circuit, power means for cyclically operating said circuit-closer to effect the retraction of said lay, and a shuttle-controlled circuit-closer in said controlling circuit actuated upon the retraction of said lay to its dwell for maintaining said lay at its dwell, and said last-named circuit-closer being operated by the shuttle upon its arrival at the shuttle box to influence said controlling circuit and permit the fall of the lay.

9. In a power loom, the combination of a lay motion including a lay, having opposite shuttle boxes and a shuttle movable between said boxes, means for cyclically operating said lay motion including an electric controlling circuit, a circuit-closer in said circuit, power means mechanically independent of said lay motion for cyclically operating said circuit-closer to effect the retraction of the lay, a pair of circuit-closers in said circuit arranged one at each shuttle box, means for rendering said last-named circuit-closers alternately operative for retaining said lay at its dwell, said operative circuit-closer being at the shuttle box about to receive said shuttle and being operated by the arriving shuttle to permit the operative stroke of the lay.

10. In a power loom, the combination of a lay, means for cyclically operating said lay including a controlling circuit, a cyclically-operating circuit-closer in said circuit for effecting the operation of the lay, and means for influencing said circuit to permit the lay to remain in an inactive position intermediate its dwell and its forward position.

11. In a power loom, the combination of a lay, a heddle motion, fluid-pressure-operated means for retracting said lay, means for cyclically operating said fluid-pressure-operated means, means controlled by said heddle motion for retaining said lay at its dwell, and shuttle-controlled means operated upon the boxing of said shuttle for permitting the operative movement of the lay.

12. In a power loom, the combination of a lay motion including a lay, a heddle motion, means for retracting said lay to its dwell, cyclically-operated means for controlling said lay-retracting means, means controlled by said heddle motion for retaining said lay at its dwell, shuttle-controlled means operated upon the boxing of said shuttle for permitting the operative movement of the lay, and means for permitting the operation of said lay independently of said cyclically-operated means and said shuttle-controlled means.

13. In a power loom, the combination of a lay, fluid-pressure-operated means for retracting said lay, a continuously rotatable cyclically operable member, a circuit-closer actuated by said rotatable member, and electric circuit means including said circuit-closer for controlling the retraction of the lay by said fluid-pressure-operated means.

14. In a power loom, the combination of a lay motion, a circuit-closer, means for cyclically operating said circuit-closer to effect successive operations thereof in each loom cycle, and electrically controlled means co-operating with said circuit-closer for operating said lay motion to produce successive lay beats on the same weft strand.

15. In a power loom, the combination of a lay motion, means for operating said lay motion including a circuit-closer, means for cyclically operating said circuit-closer successively in each loom cycle for effecting successive lay beats on the same weft strand, and shuttle-controlled circuit-closer means co-operating with said lay motion operating means for controlling the first of said successive lay beats.

16. In a power loom, the combination of a heddle motion, means for cyclically operating said heddle motion, a lay motion, electrically-controlled means for operating said lay motion, timing means controlled by said heddle motion operating means for co-ordinating the operation of said lay motion with the operation of said heddle motion, and means for stopping the operation of said lay motion independently of said heddle motion operating means.

17. In a power loom, the combination of a lay motion including a lay, means for controlling the cyclic operation of said lay motion, a circuit-closer co-operating with said controlling means, movable means for effecting the operation of said circuit-closer, manually operated means for controlling the operation of said movable means, and means operated simultaneously with the stopping of said movable means for retracting said lay.

18. In a power loom, the combination of a lay motion, a shuttle motion, a circuit-closer, means other than said motions for cyclically operating said circuit-closer, and electrically-controlled means co-operating with said circuit-closer for operating said lay motion.

19. In a power loom, the combination of a lay motion including a lay, movable means for controlling the cyclic operation of said lay motion, and means operated simultaneously with the stopping of said movable means at any point in the loom cycle for moving said lay to a retracted position if not already in such position.

20. In a power loom, the combination of a lay motion including a lay, movable means for controlling the cyclic operation of said lay motion, and electrically-controlled means operated simultaneously with the stopping of said movable means at any point in the loom cycle for moving said lay to a retracted position if not already in such position.

21. In a power loom, the combination of a lay motion including a lay, movable means for cyclically operating said lay motion, means for controlling the operation of said movable means, and means operated simultaneously with the stopping of said movable means at any point in the loom cycle for effecting the movement of said lay to a retracted position if not already in such position.

22. In a power loom, the combination of a heddle motion, a lay motion including a lay and actuating means therefor, means for controlling the co-ordinated operation of said motions, and manually controlled means for operating said lay actuating means at will independently of said co-ordinating controlling means.

23. In a power loom, the combination of a heddle motion, a lay motion including a lay and fluid pressure actuating means therefor, means for controlling the co-ordinated operation of said motions, and manualy controlled means for operating said lay actuating means at will independently of said co-ordinating controlling means.

In testimony whereof, I affix my signature.
ALBERT B. WEISSENBORN.